Dec. 22, 1959 — L. D. VERMETTE — 2,918,565
VEHICLE DOOR LIGHTS
Filed July 18, 1957
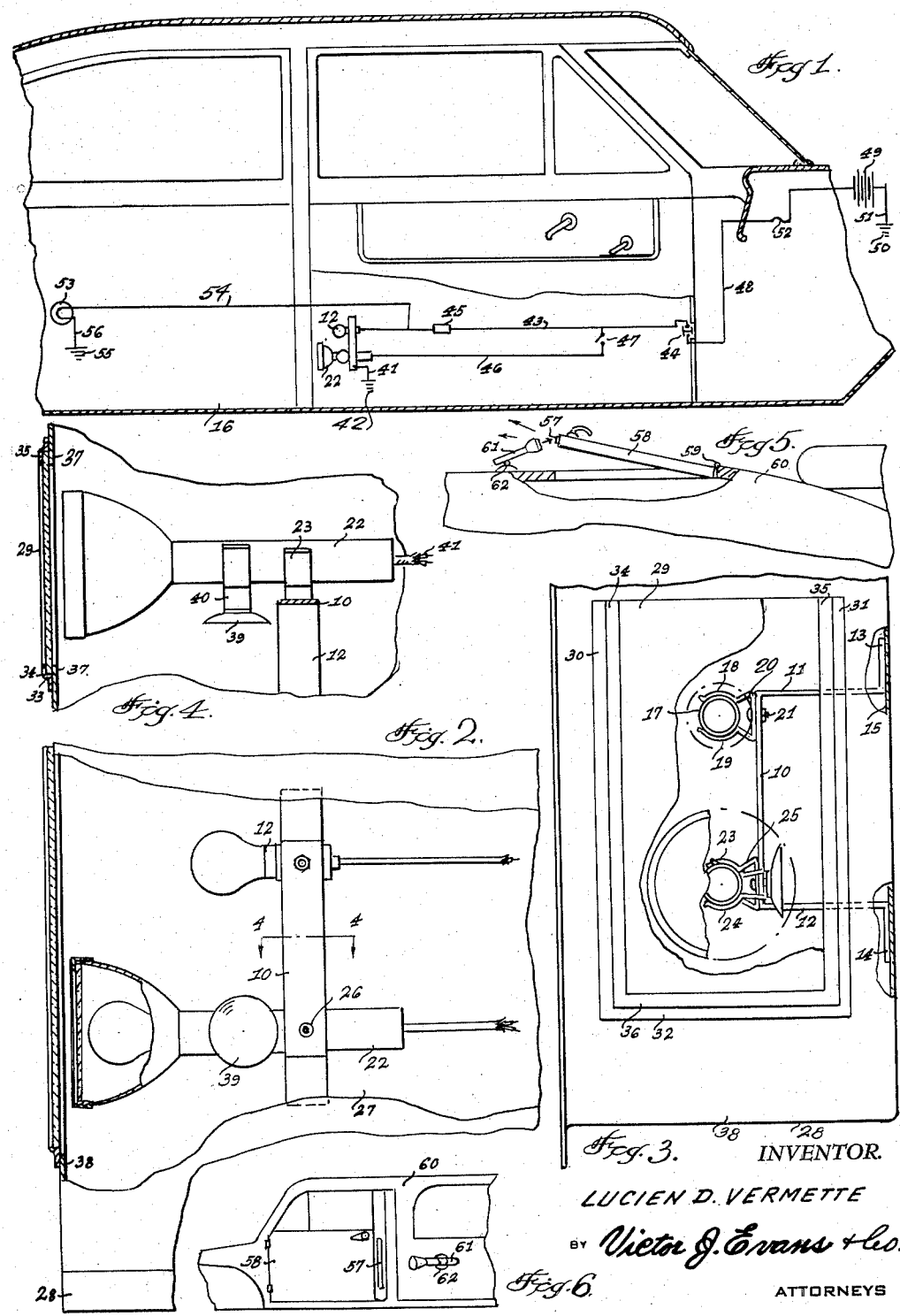
INVENTOR.
LUCIEN D. VERMETTE
BY Victor J. Evans & Co.
ATTORNEYS United States Patent Office 2,918,565
Patented Dec. 22, 1959

2,918,565

VEHICLE DOOR LIGHTS

Lucien D. Vermette, Armonk, N.Y.

Application July 18, 1957, Serial No. 672,684

1 Claim. (Cl. 240—7.1)

This invention relates to signals and lights of motor vehicles and particularly trouble lights, and in particular a light or reflector on the inner surface or extended edge of a door of a motor vehicle whereby upon opening the door a warning light is displayed to a passing vehicle indicating that the door is open, and wherein one light carried on the inner surface of the door, and which is provided with a vacuum cup for temporarily attaching a light to the part of the vehicle is designed to be removed and used as a trouble light.

The purpose of this invention is to eliminate accidents resulting from operators of motor vehicles opening doors on left hand sides of the vehicles.

In numerous instances operators of motor vehicles, after parking the vehicles against the curb on the right hand side of the street, open the front door on the left hand side with the door swinging outwardly in the path of passing vehicles and in sections where street lights are not positioned to throw light upon the door or where street lights are not used it is sometimes difficult to see the open door until it is too late to stop or swing around the door. With this thought in mind this invention contemplates providing a light or a plurality of lights or a reflector on the edge of a vehicle door whereby the lights are displayed as soon as the door is opened.

The object of this invention is, therefore, to provide means for installing a warning light on an edge of a motor vehicle door whereby the light is displayed immediately upon opening the door.

Another object of the invention is to provide a warning light or reflector designed to be used on the edge of a motor vehicle door in which the light or reflector is formed to be used in doors of vehicles now in use.

A further object of the invention is to provide means for incorporating lights in doors of motor vehicles to warn passing vehicles as doors of the vehicle are opened in which the light assembly is of a simple and economical construction.

With these and other objects and advantages in view the invention embodies a motor vehicle door having a window in the edge thereof opposite to the edge hinged to the body of the vehicle, a bracket secured to the inner surface of the door and positioned in alignment with the window, a reflector positioned on the edge of the door, a trouble light removably mounted in a spring clip on the bracket and positioned to send rays of light through the window, a vacuum cup on the trouble light, and a flickering light also mounted on the bracket and positioned to send rays of light through said window.

Other features and advantages of the invention will appear from the following description taken in connection with the drawing, wherein:

Figure 1 is a longitudinal section through a motor vehicle body with parts of the ends broken away and with the chassis omitted, showing a typical mounting of a flickering light, and also of a trouble light in the edge of a door of the vehicle and positioned to be displayed upon opening of the door.

Figure 2 is a side elevational view similar to that shown in Fig. 1 showing a portion of the rear edge of a door of a vehicle with parts broken away and with parts shown on an enlarged scale illustrating a typical mounting of a flickering light and also of a trouble light with both the flickering and trouble lights positioned to send rays of light through a window in the edge of a door of a vehicle.

Figure 3 is an end elevational view showing the edge of a door of a vehicle with the parts shown on an enlarged scale and with parts broken away also showing the flickering and trouble lights carried by a bracket mounted on the inner surface of the door.

Figure 4 is a sectional plan through the portion of a door of a vehicle taken on line 4—4 of Fig. 2 illustrating the spring clip for retaining the trouble light in position in the door and also showing the vacuum cup on the trouble light for supporting the trouble light on a part of a vehicle, to facilitate changing tires or repairing other parts of the vehicle.

Figure 5 is a sectional plan through a portion of one side of a motor vehicle body with the front door partly open and showing the reflector on the edge of the front door and also a flashlight attached to the side of the vehicle body with a vacuum cup for supplying rays of light to the reflector.

Figure 6 is a side elevational view of a portion of a motor vehicle with the parts shown on a reduced scale also showing a flashlight secured to the side of the vehicle body with a vacuum cup and positioned to illuminate a reflector on the edge of a door of the vehicle.

Referring now to the drawing wherein like reference characters denote corresponding parts the improved motor vehicle door light of this invention includes a substantially U-shaped bracket formed with a vertically disposed bar 10, and arms 11 and 12 which are provided with flanges 13 and 14 by which the bracket is secured to the inner surface of an inner wall 15 of the vehicle 16 and, as illustrated in Fig. 3, one light 17 is held between spring fingers 18 and 19 of a clip 20 that is secured to the bar 10 by suitable fasteners, such as rivets 21, and a trouble light 22 is secured by similar spring fingers 23 and 24, of a clip 25, and the clip 25 is secured to the bar 10 by a suitable fastener, such as a rivet or bolt 26.

The lights 17 and 22 are positioned in a cavity 27 of a door 28 and the cavity is closed with a glass panel 29, preferably colored red, in a frame including side members 30 and 31 and a lower cross member 32. The members 30, 31, and 32 are preferably Z-shaped in cross section, as shown in Figs. 2 and 4 and the glass panel 29 is retained in a channel 33 therein which is positioned between inner flanges 34 and 35 at the sides and 36 at the lower end, and the continuous inner edge 37 of a web 38 forming the end of the door.

The light 22 is provided with a suction cup 39 that is secured to the handle thereof by a bracket 40 and with the light provided with a relatively long electric cord 41 it may be removed from the door and carried to any suitable location around the vehicle.

The bracket having the outer bar 10 on which the lights are mounted is grounded as indicated by the wire 41 and the ground 42 and a wire 43 which extends from one terminal of the light to a switch 44 on the hinge edge of the door, is provided with an intermittent or flickering switch 45, and one terminal of the light 22 is connected by a wire 46 to the wire 43 through a switch 47. One terminal of the switch 44 at the edge of the door is connected by a wire 48 to one terminal of a battery 49, the opposite side of which is connected to a ground 50 by a wire 51. The wire 48 is provided with a fuse 52.

A light 53 is also provided on the left rear side of the vehicle and the light 53 is connected by a wire 54 to the wire 43 and also to a ground 55 by a wire 56.

With the lights assembled and installed in a motor vehicle door as illustrated and described and with a conventional switch 44 positioned at the edge of the door hinged to the body of the vehicle the switch is closed as the door is opened completing a circuit to the flickering light 12 and also to the light 22; and should it be necessary to repair the vehicle or change a tire the light 22 is removed from the clip formed by the spring fingers 23 and 24, carried to a suitable location, and secured to a part of the vehicle by the vacuum cup 39. With the trouble light removed the light 12 operates as a warning, indicating to a passing vehicle that the door is open.

The installation may be considered as typical as a bracket of any suitable form may be used and lights of different types or designs may be temporarily mounted on the bracket. The lights may also be positioned at different points on the door of the vehicle.

As illustrated in Figs. 5 and 6 a reflector 57 may be mounted on the edge of a door 58 which is secured by a hinge 59 to the side of a motor vehicle body 60 and with the door open rays of light from the headlights of an approaching vehicle are reflected back to the vehicle, or such rays may illuminate a strip of luminous paint or the like to show the edge of the door.

In some instances it may be desirable to use a flashlight 61 on the side of the vehicle body with the flashlight secured in place by a vacuum cup 62 or by other suitable means.

It will be understood that reflectors or strips of material having luminous paint or the like thereon or sections of the edge of the door may be covered with luminous paint or other reflecting means as may be desired.

It will be understood that modifications, within the scope of the appended claim, may be made in the design and arrangement of the parts without departing from the spirit of the invention.

What is claimed is:

In a motor vehicle door light mounting, the combination which comprises a motor vehicle door having inner and outer walls positioned with one edge hinged to a side wall of a vehicle and with the opposite edge temporarily secured in the side wall of the vehicle by a latch, said door having a cavity extended inwardly in the edge opposite to the edge hinged to the wall of the vehicle, a U-shaped support including vertically spaced horizontally disposed arms extended from upper and lower ends of a vertical bar and with the extended ends of the arms provided with flanges for attaching the bracket to a wall of the door, means for securing the flanges on the ends of the arms of the bracket to the door, vertically spaced light bulb retaining spring clips on the vertical bar for positioning light bulbs in the cavity whereby light from the bulbs passes through an open end of the cavity, a U-shaped frame positioned on the sides and bottom of the open end of the cavity and secured to the door, and a transparent panel removably mounted in said U-shaped frame providing a closure for the cavity.

References Cited in the file of this patent

UNITED STATES PATENTS

| | | |
|---|---|---|
| 1,248,930 | Schulz | Dec. 4, 1917 |
| 1,673,647 | Strang | June 12, 1928 |
| 1,721,347 | Magree et al. | July 16, 1929 |
| 1,943,440 | Horni | Jan. 16, 1934 |
| 2,089,596 | Buhr | Aug. 10, 1937 |
| 2,093,907 | Clark | Sept. 21, 1937 |
| 2,308,844 | Wilshusen | Jan. 19, 1943 |
| 2,483,058 | Mack | Sept. 27, 1949 |
| 2,677,752 | Kaiser | May 4, 1954 |
| 2,780,802 | Propos | Feb. 5, 1957 |
| 2,844,810 | Steele | July 22, 1958 |